United States Patent Office.

HENRY PEMBERTON, OF ALLEGHENY CITY, PENNSYLVANIA.

Letters Patent No. 60,780, dated January 1, 1867.

IMPROVEMENT IN THE MANUFACTURE OF SULPHATE OF ALUMINA, ALUM, AND OTHER ALUMINOUS COMPOUNDS.

*The Schedule referred to in these Letters Patent and making part of the same.*

TO ALL WHOM IT MAY CONCERN:

Be it known that I, HENRY PEMBERTON, of the city of Allegheny, in the county of Allegheny, and State of Pennsylvania, have invented a new and useful improvement in the Manufacture of Sulphate of Alumina, Alum, and other Aluminous Compounds; and I do hereby declare the following to be a full, clear, and exact description thereof.

The ordinary process of making sulphate of alumina consists in treating alumina, either in the shape of hydrate, or in combination with silica, oxide of iron, or other substances, with sulphuric acid, which, for this purpose, has heretofore been prepared by the combustion of sulphur or the sulphurets of the metals, and the subsequent oxidation of the resulting sulphurous acid, into sulphuric acid in the usual and well-known manner. My discovery consists in the application to the manufacture of sulphate of alumina, alum, and other aluminous compounds of the impure sulphuric acid obtained from the acid residuum, an acid tar, resulting from the treatment of coal oils, such as petroleum, coal oil proper, and other hyrdo-carburets, in the process of refining them, thus saving the cost of producing the sulphuric acid by the direct and original preparation from sulphur or the sulphurets, as is now universally practised. The impure sulphuric acid which I employ for this purpose I obtain in the manner described in Letters Patent of the United States, granted to me on the second day of August, A. D. 1859, for an "Improvement in Refining Coal Oils," the process therein described consisting of the recovery of the sulphuric acid used in the refining of the oil obtained by the destructive distillation of coal, bituminous shales, &c., or petroleum, or other similar hydro-carburets, from the residuum resulting from such purification. This recovering of the sulphuric acid is effected by exposing the residuum (which is a compound of acid and tarry matters) to the combined action of water and heat under agitation, whereby, under the influence of the high temperature produced by the use of steam or hot water, or by chemical action in the process, or otherwise, the attraction of the tarry matters of the "residuum" for the acid is overcome by the superior affinity of the acid for the water, so that the acid separates itself from the tarry matter, and dissolves in the water, thus yielding a dilute sulphuric acid. The dilute sulphuric acid thus procured from the otherwise useless "residuum" is of a dark coffee-color, owing to the fact that it still holds in solution certain tarry and oily matters and organic bases which are in combination with the acid, and which would appear to render it unfit for use for the purposes to which I propose to apply it. I have discovered, however, that these foreign coloring matters, instead of entering into combination or mixing with the alumina, in the process of manufacturing sulphate of alumina, alum, &c., are thrown out of solution and combination with the sulphuric acid by the alumina, and on separating therefrom, rise as a tarry or oily scum to the surface, leaving the resulting solution of sulphate of alumina (when pure alumina is used) perfectly colorless and pure, which yields, by evaporation and cooling, perfectly white sulphate of alumina, or, by precipitating in the ordinary manner with the salts of potash or ammonia, white and pure potassa, alum, or ammoniacal alum, as the case may be.

To enable others skilled in the art to make practical use of my invention, I will proceed to describe my process in detail.

The dark-colored acid liquid resulting from the treatment of equal volumes of acid, tar, and water, in the manner described in my patent of August, secured A. D. 1859, hereinbefore referred to, is drawn off into a suitable vessel, and heated therein to boiling by injecting steam through a leaden pipe or otherwise; and when it is boiling, the hydrate of alumina, in the state of a wet pulp or a wet mass, is added little by little, so as to avoid too violent an ebullition and effervescence by the escape of carbonic acid from the traces of carbonate of soda remaining with the alumina. This addition of alumina is continued and the ebullition maintained until it is found by testing that the alumina has dissolved in the acid in the desired proportion to form neutral sulphate of alumina, ($Al_2O_3 + 3SO_3$,) when the heat may be withdrawn, and the liquid allowed to remain at rest to settle. The solution thus obtained is at first slightly turbid, and mixed with a considerable quantity of oil or tar, which, however, soon rise to the top, and may be skimmed off, leaving the solution colorless. If, however, it should yet retain any traces of color or smell, which is seldom the case, a little bone-black or solution of hypo-chlorite of soda may be added, which effectually removes these defects. The colorless solution thus obtained may be used for the preparation of sulphate of alumina, or potassa alum, or ammonia alum, in the ordinary and well-known manner. The impure dilute sulphuric acid obtained from the acid "residuum," as before described, may be more perfectly purified or concentrated, if desired, before using, in my process. For the preparation of the sulphate of alumina from alumina, in combination with other matters, the above-described dark, impure solution of sulphuric acid should be concentrated to the density of from 60° to 63° Baumé, when it may be mixed with the silicates of alumina, or other compounds thereof, and treated in the same manner as if the acid had been commercially pure sulphuric acid of the same density. The solution of sulphate of alumina thus obtained contains, of course, the same impurities as would be present in the sulphate prepared in the ordinary manner from chamber acid.

What I claim as my invention, and desire to secure by Letters Patent, is—

The employment, in the manufacture of sulphate of alumina, alum and other aluminous compounds, of the acid solution obtained from the tarry acid residuum of the treatment, for the purpose of refining of petroleum, coal oils, and other hydro-carburets.

In testimony whereof I, the said HENRY PEMBERTON, have hereunto set my hand in the presence of

H. PEMBERTON.

Witnesses:
    A. S. NICHOLSON,
    W. BAKEWELL.